(12) United States Patent
Cevahir

(10) Patent No.: US 11,301,509 B2
(45) Date of Patent: Apr. 12, 2022

(54) IMAGE SEARCH SYSTEM, IMAGE SEARCH METHOD, AND PROGRAM

(71) Applicant: RAKUTEN GROUP, INC., Tokyo (JP)

(72) Inventor: Ali Cevahir, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 665 days.

(21) Appl. No.: 16/312,250

(22) PCT Filed: Jan. 20, 2017

(86) PCT No.: PCT/JP2017/001919
§ 371 (c)(1),
(2) Date: Dec. 20, 2018

(87) PCT Pub. No.: WO2018/134964
PCT Pub. Date: Jul. 26, 2018

(65) Prior Publication Data
US 2019/0205331 A1     Jul. 4, 2019

(51) Int. Cl.
*G06F 16/51*    (2019.01)
*G06F 16/00*    (2019.01)
*G06F 16/55*    (2019.01)
*G06F 16/538*    (2019.01)
*G06F 16/56*    (2019.01)
*G06N 3/08*    (2006.01)

(52) U.S. Cl.
CPC ............. *G06F 16/51* (2019.01); *G06F 16/00* (2019.01); *G06F 16/538* (2019.01); *G06F 16/55* (2019.01); *G06F 16/56* (2019.01); *G06N 3/08* (2013.01)

(58) Field of Classification Search
CPC .......... G06F 16/51; G06F 16/00; G06F 16/55; G06F 16/538; G06F 16/56
USPC ......................................... 707/737, 758, 915
See application file for complete search history.

(56) References Cited

U.S. PATENT DOCUMENTS 9,076,078 B2 * 7/2015 Miyashita ............ G06K 9/6253
9,747,305 B2 * 8/2017 Cevahir ............... G06K 9/6215
(Continued)

FOREIGN PATENT DOCUMENTS

JP     2011-128773 A     6/2011

OTHER PUBLICATIONS

Jegou, H., Douze, M., Schmid, C., Perez, P.: Aggregating Local Descriptors into a Compact Image Representation. In: IEEE Conference on Computer Vision and Pattern Recognition (CVPR 2010). IEEE, San Francisco, pp. 3304-3311 (Mar. 2010).
(Continued)

*Primary Examiner* — Phong H Nguyen
(74) *Attorney, Agent, or Firm* — HEA Law PLLC

(57) ABSTRACT

To search for a similar image more accurately, an image search system acquires a plurality of representative vectors, which are generated based on a plurality of feature vectors each indicating a feature of an image and included in a feature vector space, calculates a scalar value indicating a degree of similarity between each of the plurality of feature vectors and one of the representative vectors corresponding to the feature vector, calculates, for each of images, a feature value indicating a feature that depends on the representative vector based on the scalar value, and creates a search index associated with the calculated feature value.

8 Claims, 11 Drawing Sheets

(56) References Cited

U.S. PATENT DOCUMENTS

| | | | |
|---|---|---|---|
| 2009/0309961 A1* | 12/2009 | Miyashita | H04N 5/23229 348/222.1 |
| 2011/0026849 A1* | 2/2011 | Kameyama | G06V 10/76 382/260 |
| 2015/0016729 A1* | 1/2015 | Cevahir | G06K 9/627 382/195 |
| 2017/0004399 A1 | 1/2017 | Kasahara | |
| 2018/0240217 A1* | 8/2018 | Wang | G06V 10/464 |
| 2020/0029084 A1* | 1/2020 | Wierstra | H04N 19/30 |

OTHER PUBLICATIONS

Nister, D. and Stewenius, H., Scalable Recognition with a Vocabulary Tree, 2006 IEEE Computer Society Conference on Computer Vision and Pattern Recognition (CVPR2006), Jun. 2006, pp. 2161-2168, ISSN: 1063-6919, <DOI: 10.1109/CVPR.2006.264>, particularly, paragraph of '3. Building and Using the Vocabulary Tree'.
English Translation of International Search Report for PCT/JP2017/001919 dated Mar. 21, 2017.

\* cited by examiner

IMAGE SEARCH SYSTEM, IMAGE SEARCH METHOD, AND PROGRAM

CROSS REFERENCE TO RELATED APPLICATIONS

This application is a National Stage of International Application No. PCT/JP2017/001919 filed on Jan. 20, 2017. The contents of the above document is incorporated herein by reference in its entirety.

TECHNICAL FIELD

The present invention relates to an image search system, an image search method, and a program.

BACKGROUND ART

An extremely large number of image files are managed due to development of, for example, a network technology. A technology of searching a large number of images for an image similar to a query image is generally used. There is known a Bug-of-Visual (BoV) words model as an image search technique. The BoV model involves extracting, from image data, a plurality of feature vectors each indicating a local feature of the image by a known technique. The amount of data of the feature vector is large, and thus visual words having vectors closest to respective feature vectors are used to compress the amount of data.

In Non-Patent Literature 1, in order to further reduce the amount of data indicating the feature of an image, there is disclosed a technique involving acquiring, for each visual word, a difference (difference vector) between a feature vector corresponding to the visual word and a representative vector representing the visual word, summing the differences to acquire a sum (sum vector), and storing data that depends on the sum vector into a storage. In this technique, an image similar to a query image is retrieved for based on the data that depends on the sum vector and a sum vector acquired from the query image.

CITATION LIST

Non Patent Literature

[NPL 1] Jegou, H., Douze, M., Schmid, C., Perez, P.: Aggregating Local Descriptors into a Compact Image Representation. In: IEEE Conference on Computer Vision and Pattern Recognition (CVPR 2010). IEEE, San Francisco, pp. 3304-3311 (2010)

SUMMARY OF INVENTION

Technical Problem

In a case where the sum of difference vectors between feature vectors and representative vectors representing visual words is acquired, for example, when the directions of difference vectors are opposite to each other for two feature vectors, the value of each element of the sum vector becomes smaller. In such a case, the feature of the image is not adequately reflected in a search with the image.

The present invention has been made in view of the above-mentioned problem, and has an object to provide a more accurate image search technology.

Solution to Problem

In order to solve the above-mentioned problem, according to one embodiment of the present invention, there is provided an image search system including: representative vector acquisition means for acquiring a plurality of representative vectors, which are generated based on a plurality of feature vectors each indicating a feature of an image and included in a feature vector space; scalar value calculation means for calculating a scalar value indicating a degree of similarity between each of the plurality of feature vectors and one of the plurality of representative vectors corresponding to the each of the plurality of feature vectors; feature value calculation means for calculating, for each of images, a feature value indicating a feature that depends on each of the plurality of representative vectors based on the scalar value; and index creation means for creating a search index associated with the calculated feature value.

Further, according to one embodiment of the present invention, there is provided a program for causing a computer to function as: representative vector acquisition means for acquiring a plurality of representative vectors, which are generated based on a plurality of feature vectors each indicating a feature of an image and included in a feature vector space; scalar value calculation means for calculating a scalar value indicating a degree of similarity between each of the plurality of feature vectors and one of the plurality of representative vectors corresponding to the each of the plurality of feature vectors; feature value calculation means for calculating, for each of images, a feature value indicating a feature that depends on each of the plurality of representative vectors based on the scalar value; and index creation means for creating a search index associated with the calculated feature value.

Further, according to one embodiment of the present invention, there is provided an image search method including the steps of: acquiring a plurality of representative vectors, which are generated based on a plurality of feature vectors each indicating a feature of an image and included in a feature vector space; calculating a scalar value indicating a degree of similarity between each of the plurality of feature vectors and one of the plurality of representative vectors corresponding to the each of the plurality of feature vectors; calculating, for each of images, a feature value indicating a feature that depends on each of the plurality of representative vectors based on the scalar value; and creating a search index associated with the calculated feature value.

According to the embodiments of the present invention, it is possible to search for an image more accurately.

In one embodiment of the present invention, the feature value calculation means may be configured to calculate, for each of the images, a sum of scalar values which are calculated, for each of the plurality of representative vectors, between corresponding one of the plurality of representative vectors and the plurality of feature vectors.

In one embodiment of the present invention, the scalar value calculation means may be configured to calculate, for each of the plurality of representative vectors, a distance between corresponding one of the plurality of representative vectors and each of the plurality of feature vectors corresponding to the corresponding one of the plurality of representative vectors as the scalar value.

In one embodiment of the present invention, the representative vector generation means may be configured to determine a representative vector corresponding to each of the plurality of feature vectors.

In one embodiment of the present invention, the representative vector generation means may be configured to classify the plurality of feature vectors into a plurality of clusters, and generate a plurality of representative vectors each representing any one of the plurality of clusters.

In one embodiment of the present invention, the plurality of representative vectors may include a plurality of first representative vectors and a plurality of second representative vectors, each of the plurality of second representative vectors may correspond to anyone of the plurality of first representative vectors, and the representative vector generation means may be configured to associate each of the plurality of feature vectors with any one of the plurality of second representative vectors, and with one of the plurality of first representative vectors corresponding to the one of the plurality of second representative vectors.

In one embodiment of the present invention, the index creation means may be configured to compress a plurality of feature values for each of a plurality of images to create an index having a smaller data amount than a data amount of the plurality of feature values.

In one embodiment of the present invention, the index creation means may be configured to compress the plurality of feature values for each of the plurality of images by autoencoders.

In one embodiment of the present invention, the representative vector generation means may be configured to generate, when a number of feature vectors associated with one of the plurality of first representative vectors is larger than a predetermined value, a plurality of second representative vectors corresponding to the one of the plurality of first representative vectors, and at least one of the plurality of first representative vectors may be inhibited from corresponding to any one of the plurality of second representative vectors.

In one embodiment of the present invention, the image search system may further include image search means for searching for an image similar to a query image based on the search index and a feature value acquired from the query image.

DESCRIPTION OF EMBODIMENTS

An embodiment of the present invention is now described with reference to the drawings. Constituent elements in the following description having the same function as each other are denoted with the same reference symbol, and a duplicate description of such constituent elements is omitted.

Figure 1:
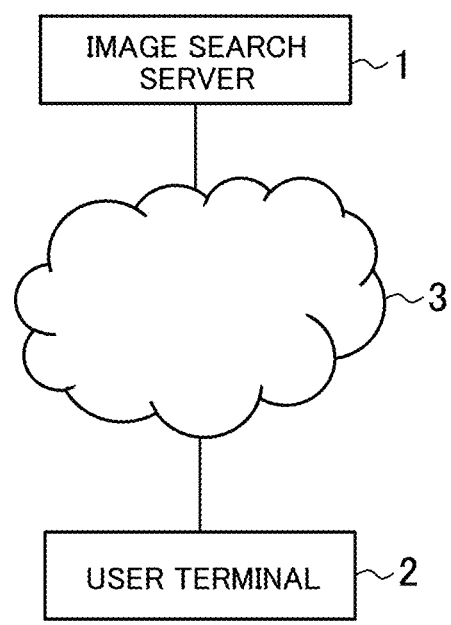
FIG. 1 is a diagram for schematically illustrating a configuration of an image search system according to an embodiment of the present invention.

FIG. 1 is a diagram for illustrating an example of a configuration of an image search system according to a first embodiment of the present invention. The image search system includes an image search server 1 and a user terminal 2. The image search server 1 is a server computer in which an image search program and a web server program (e.g., httpd) are executed, and the user terminal 2 is, for example, a personal computer or a smartphone in which the program of a web browser is executed. The image search server 1 and the user terminal 2 are configured to communicate to/from each other via a network 3. The network 3 is, for example, a local area network or the Internet.

An outline of an operation when the image search system performs an image search is as follows. First, the image search server 1 acquires, from the user terminal 2 via the network 3, an image (hereinafter referred to as "query image") serving as a query to be used for an image search. Next, the image search server 1 retrieves one or a plurality of images similar to the query image, and outputs data on the retrieved image to, for example, the user terminal 2.

Figure 2:
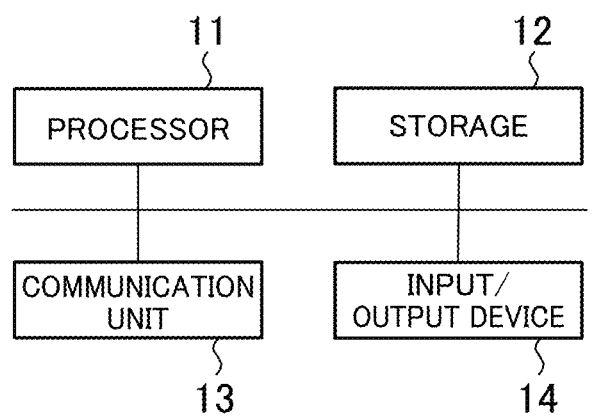
FIG. 2 is a diagram for illustrating an example of a hardware configuration of an image search server.

FIG. 2 is a diagram for illustrating an example of a configuration of the image search server 1 in the first embodiment. The image search server 1 includes a processor 11, a storage 12, a communication unit 13, and an input/output device 14.

The processor 11 operates in accordance with a program stored in the storage 12. The processor 11 controls the communication unit 13 and the input/output device 14. The above-mentioned program may be provided via the network such as the Internet, or provided by being stored in a computer-readable information storage medium such as a DVD-ROM and a flash memory.

The storage 12 includes, for example, a memory device such as a RAM and a ROM and a hard disk drive. The storage 12 stores the above-mentioned program. The storage 12 also stores information and a computational result input from each device.

The communication unit 13 implements a function of communicating to/from another device such as the user terminal 2, and is formed of, for example, communication means such as a network card. The network card includes an integrated circuit and a communication terminal for communications. The communication unit 13 inputs, to the processor 11 and the storage 12, information received from another device and transmits information to another device based on control by the processor 11.

The input/output device 14 includes, for example, a video controller configured to control a display output device and a controller configured to acquire data from an input device. The input device includes, for example, a keyboard, a mouse, and a touch panel. The input/output device 14 is configured to output data for displaying an image on the display output device based on control by the processor 11, and acquire data input through operation of the input device by the user. The display output device is, for example, a display device connected on the outside.

Similarly to the image search server 1, the user terminal 2 includes, for example, a processor 11, a storage 12, a communication unit 13, and an input/output device 14. The user terminal 2 implements a function of presenting a screen based on data received from, for example, the image search server 1, and a function of transmitting information input by the user on the screen to the image search server 1. Those functions are implemented by, for example, the processor 11 included in the user terminal 2 executing a program, for example, a browser, and performing processing that depends on data received from, for example, the image search server 1. Further, those functions may be implemented not by the browser but by a dedicated application program installed in the user terminal 2.

Figure 3:
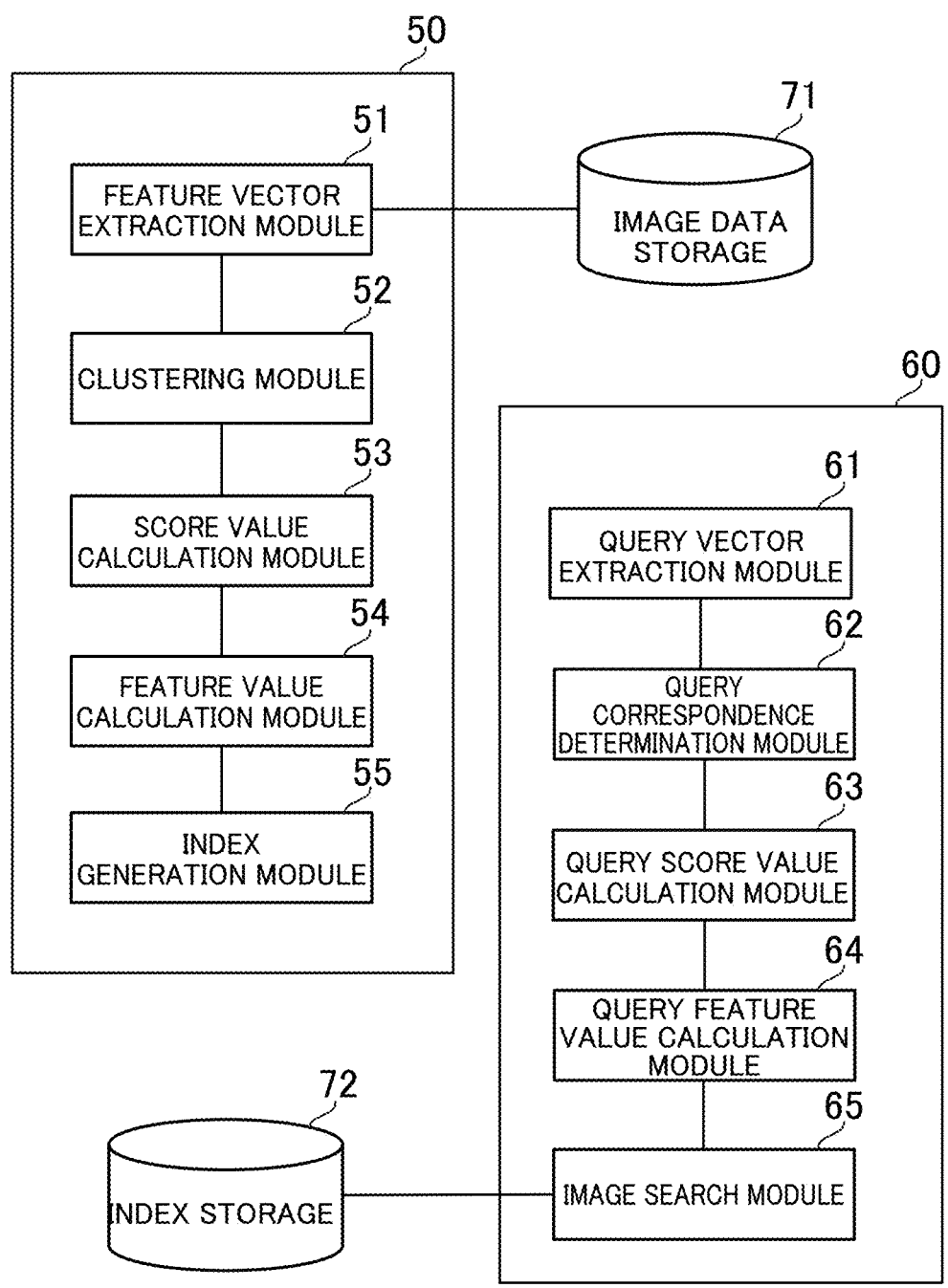
FIG. 3 is a block diagram for illustrating functions to be implemented by the image search system.

FIG. 3 is a block diagram for illustrating functions to be implemented by the image search system. The image search system includes an index processing module 50, a search processing module 60, an image data storage 71, and an index storage 72 from a functional point of view. The index processing module 50 is configured to generate, from data on a plurality of images, an index to be used for searches for those images. The search processing module 60 is configured to retrieve, based on a query image serving as a search condition and the index, an image similar to the query image. The index processing module 50, the search processing module 60, the image data storage 71, the index storage 72 are implemented by the image search server 1. The image data storage 71 and the index storage 72 may be implemented on a server different from the image search server 1, and the index processing module 50 and the search processing module 60 may be respectively implemented by servers which are different from each other.

The image data storage 71 is mainly implemented by the storage 12. The image data storage 71 stores data on a plurality of images serving as objects for search. The index storage 72 is mainly implemented by the storage 12. The index storage 72 stores an index of an image generated by an index generation module 55.

The index processing module 50 functionally includes a feature vector extraction module 51, a clustering module 52, a score value calculation module 53, a feature value calculation module 54, and the index generation module 55. The search processing module 60 functionally includes a query vector detection module 61, a query correspondence determination module 62, a query score value calculation module 63, a query feature value calculation module 64, and an image search module 65. Those functions are implemented by the processor 11 executing programs stored in the storage 12 to control the communication unit 13 and the input/output device 14.

Next, processing of the index processing module 50 is described.

The feature vector extraction module 51 is mainly implemented by the processor 11 executing a program to control the storage 12. The feature vector extraction module 51 is configured to extract, from data on a plurality of images stored in the image data storage 71, a plurality of feature vectors indicating local features of those images. Further, the feature vector extraction module 51 is configured to extract a plurality of feature vectors for one image. The number of feature vectors to be extracted from one image is determined based on the image, and a normal image produces about 300 feature vectors. Further, the dimension of the feature vector is, for example, 128.

The clustering module 52 is mainly implemented by the processor 11 executing a program to control the storage 12. The clustering module 52 is configured to generate a plurality of representative vectors based on the plurality of extracted feature vectors. More specifically, the clustering module 52 classifies the plurality of feature vectors into a plurality of clusters, and generates a plurality of representative vectors each representing anyone of the plurality of clusters based on those feature vectors. Further, the clustering module 52 associates each of the plurality of feature vectors with any one of the plurality of representative vectors. Each of the clusters corresponds to a visual word in the BoV model.

The score value calculation module 53 is mainly implemented by the processor 11 executing a program to control the storage 12. The score value calculation module 53 is configured to calculate a score value which indicates the degree of similarity between each of the plurality of representative vectors and at least apart of the plurality of feature vectors. The score value is a scalar value. For example, the score value calculation module 53 calculates, for each of the plurality of representative vectors, a distance between the representative vector and each of the plurality of feature vectors corresponding to the representative vector as the score value.

The feature value calculation module 54 is mainly implemented by the processor 11 executing a program to control the storage 12. The feature value calculation module 54 is configured to calculate, for each image and for each representative vector, a feature value indicating a feature that depends on the representative vector. The number of feature values calculated by the feature value calculation module 54 for one image is the same as that of representative vectors.

The index generation module 55 is mainly implemented by the processor 11 executing a program to control the storage 12. The index generation module 55 is configured to create a search index including the calculated feature value. The index is generated for each image, and the index generation module 55 stores the generated index into the index storage 72 in association with the image.

Figure 4:
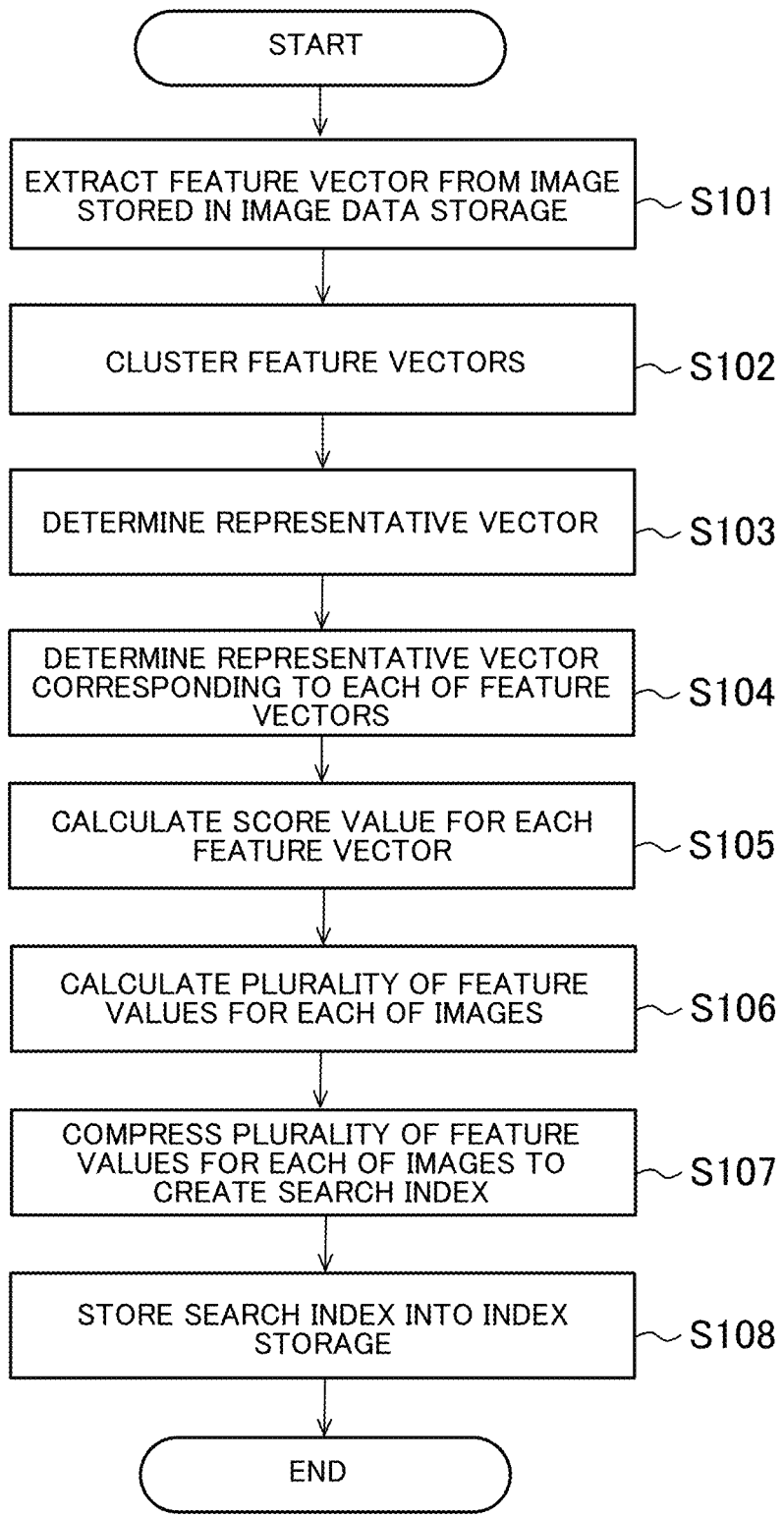
FIG. 4 is a flowchart for illustrating an example of processing by an index processing module.

Now, a description is given of processing to be executed by the index processing module 50 in more detail. FIG. 4 is a flowchart for illustrating an example of processing by the index processing module 50.

In the processing of creating an index from image data, first, the feature vector extraction module 51 extracts a feature vector from an image stored in the image data storage 71 (Step S101). Details of the technique of extracting a feature vector are publicly known, and thus a description thereof is omitted here. There is a technique called "SIFT" as the technique of extracting a feature vector indicating a local feature.

Figure 5:
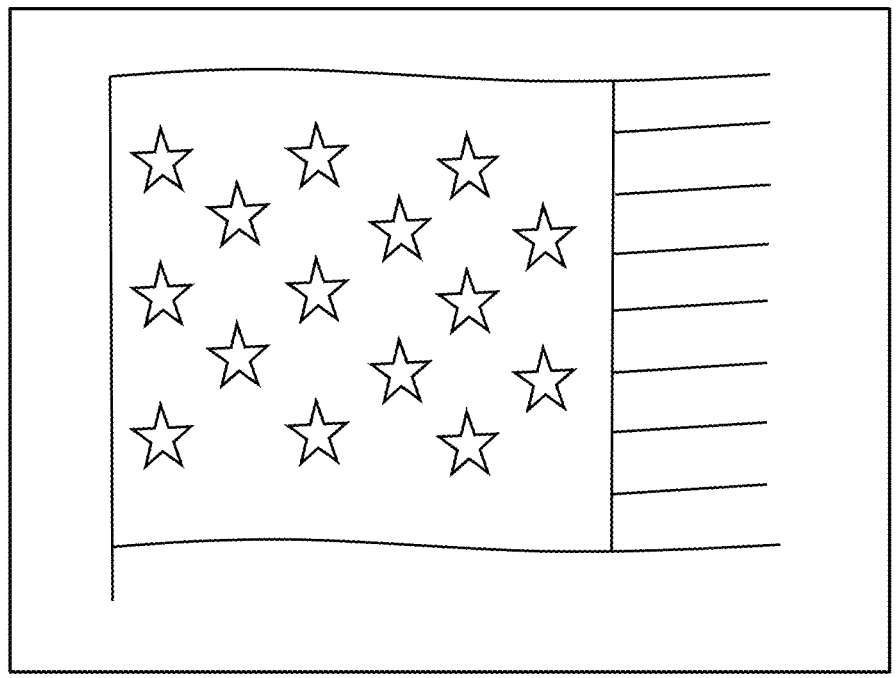
FIG. 5 is a diagram for illustrating an example of an image serving as an object for search.
Figure 6:
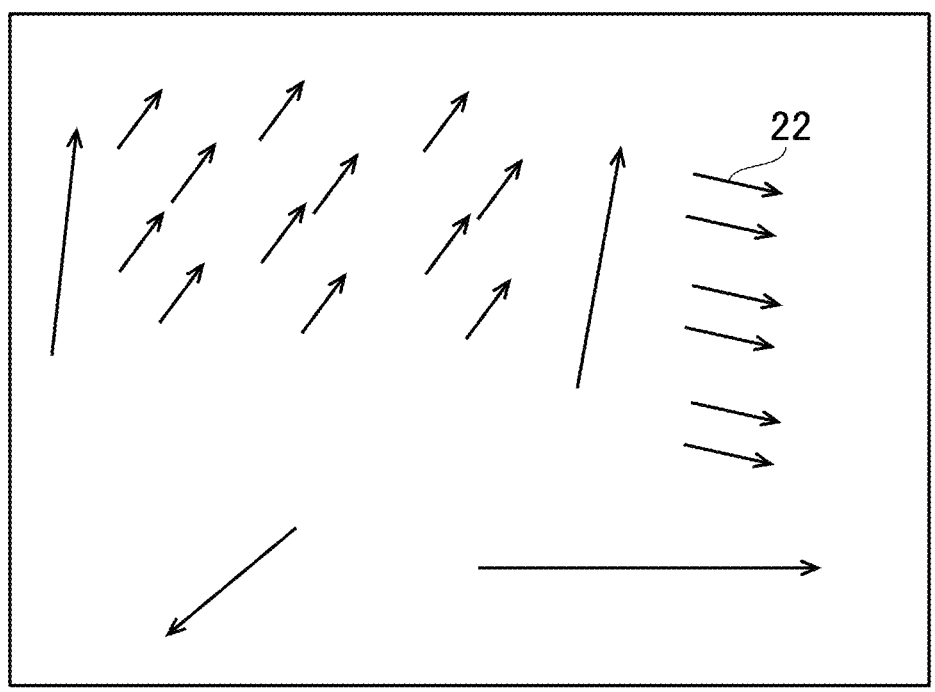
FIG. 6 is a diagram for schematically illustrating image feature vectors extracted from an image.

FIG. 5 is a diagram for illustrating an example of an image serving as an object for search. In the example of the image of FIG. 5, a part of the Stars and Stripes is illustrated. FIG. 6 is a diagram for schematically illustrating feature vectors 22 extracted from the image illustrated in FIG. 5. Feature vectors similar to each other are extracted based on a plurality of feature points having similar features within the image.

After the feature vector is extracted, the clustering module 52 clusters a plurality of feature vectors extracted from a plurality of images (Step S102). The clustering module 52 may use a known algorithm, for example, k-means clustering, to classify those feature vectors into a plurality of clusters. Further, in the first embodiment, the clustering module 52 generates clusters having a plurality of layers. More specifically, when the number of feature vectors belonging to a certain cluster on a certain layer is larger than a predetermined value, the clustering module 52 classifies feature vectors that belong to that cluster into a plurality of clusters on a lower layer. In this case, even a cluster on a higher layer may not have a cluster on a lower layer.

Further, the clustering module 52 determines a representative vector of each cluster based on the feature vectors belonging to that cluster (Step S103). For example, the clustering module 52 determines the center of gravity of feature vectors belonging to a cluster as the representative vector. The representative vector is not necessarily required to be the center of gravity, but may be any one of the feature vectors belonging to the cluster. Further, the clustering module 52 may generate the representative vector by another technique without using clustering as long as the search index has an adequately calculated feature.

Figure 7:
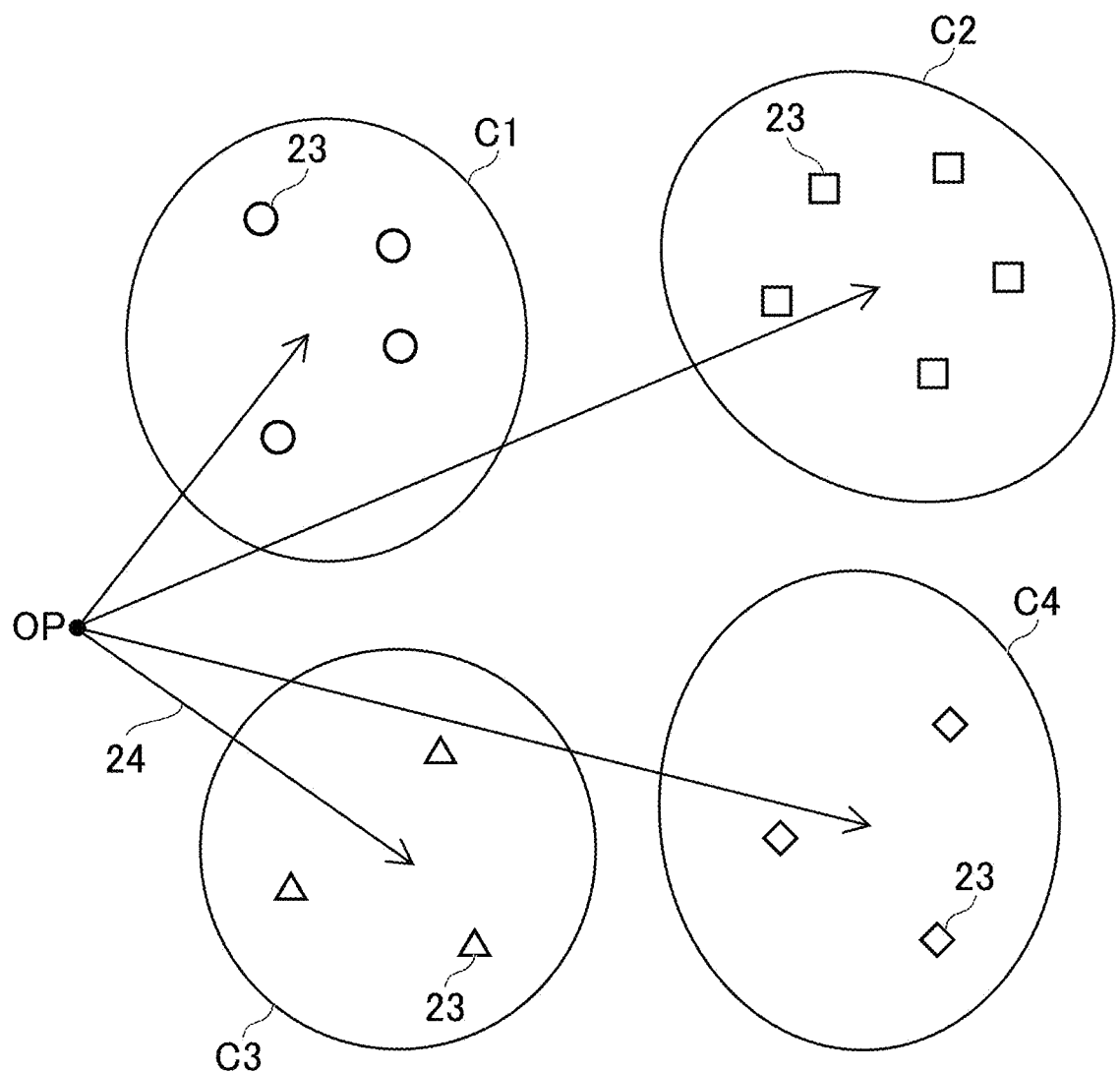
FIG. 7 is a diagram for schematically illustrating a relationship between a cluster and a representative vector.

FIG. 7 is a diagram for schematically illustrating clusters C1 to C4 and a relationship among representative vectors 24 determined for the clusters C1 to C4. In FIG. 7, for the simplicity of description, only the clusters on the top layer are illustrated. Further, for the simplicity of description, the illustration of the feature vector 22 is omitted, and points 23 indicated by symbols such as circles in FIG. 7 indicate coordinates in the feature vector space indicated by the feature vector 22. In the example of FIG. 7, a vector from an origin OP to the point 23 is the feature vector 22. The clustering module 52 determines the representative vector 24 for each of the clusters C1 to C4.

Figure 8:
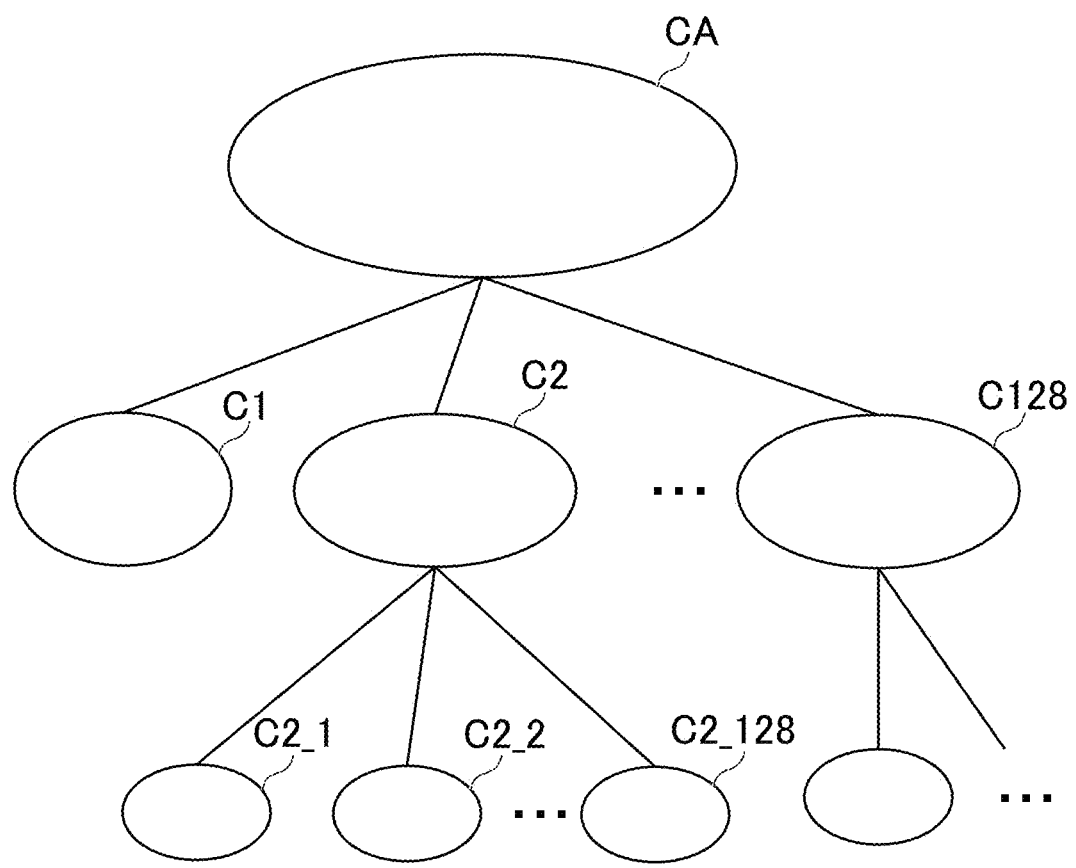
FIG. 8 is a diagram for illustrating an example of a hierarchical structure of a cluster.

FIG. 8 is a diagram for illustrating an example of a hierarchical structure of a cluster. A set CA of all the feature vectors is divided into a plurality of clusters C1 to C128, and one or a plurality of feature vectors belong to each of the clusters C1 to C128. The number of feature vectors belonging to the cluster C1 is smaller than a predetermined threshold value, and the number of feature vectors belonging to the cluster C2 is larger than the threshold value. Thus, the feature vectors belonging to the cluster C2 are classified into clusters C2_1 to C2_128 on the lower layer. Therefore, the layer (e.g., layer of cluster C1) of a cluster, which is on the lowermost layer that one feature vector belongs to, and the layer (e.g., layer of cluster C2_2) of a cluster, which is on the lowermost layer that another feature vector belongs to, may be different from each other. When there is a cluster on the lower layer of a certain cluster, the number of clusters on the lower layer is 2 or more.

Further, the clustering module 52 determines the representative vector for a cluster on any layer. For example, there is a representative vector in the cluster C2_1 as a representative vector on the lower layer of the representative vector in the cluster C2. Further, in terms of a relationship among representative vectors, one representative vector in a cluster on the higher layer corresponds to a plurality of representative vectors representing a plurality of clusters on the lower layer.

After the representative vector is determined, the clustering module 52 determines a representative vector corresponding to each of the plurality of feature vectors (Step S104). More specifically, the clustering module 52 determines the representative vector of a cluster, that a feature vector belongs to, as the representative vector corresponding to the feature vector. The clustering module 52 may determine a representative vector having a distance closest to the feature vector as the representative vector corresponding to the feature vector. Processing of classifying the feature vectors into clusters and determining the representative vector may be executed in advance by a server different from the image search server 1. In this case, the representative vector generated in advance may be stored in the storage, and the image search server 1 may read data on the representative vector stored in the storage, instead of executing the processing of determining the representative vector, for the subsequent processing.

Next, the score value calculation module 53 calculates a score value for each of the feature vectors (Step S105). The score value is a scalar value, and is not a vector. The score value indicates the degree of similarly between a feature vector and a representative vector corresponding to the feature vector. The score value may indicate a distance or degree of cosine similarity between a feature vector and a representative vector corresponding to the feature vector, or a value calculated in accordance with a predetermined expression from the similarity degree.

Figure 9:
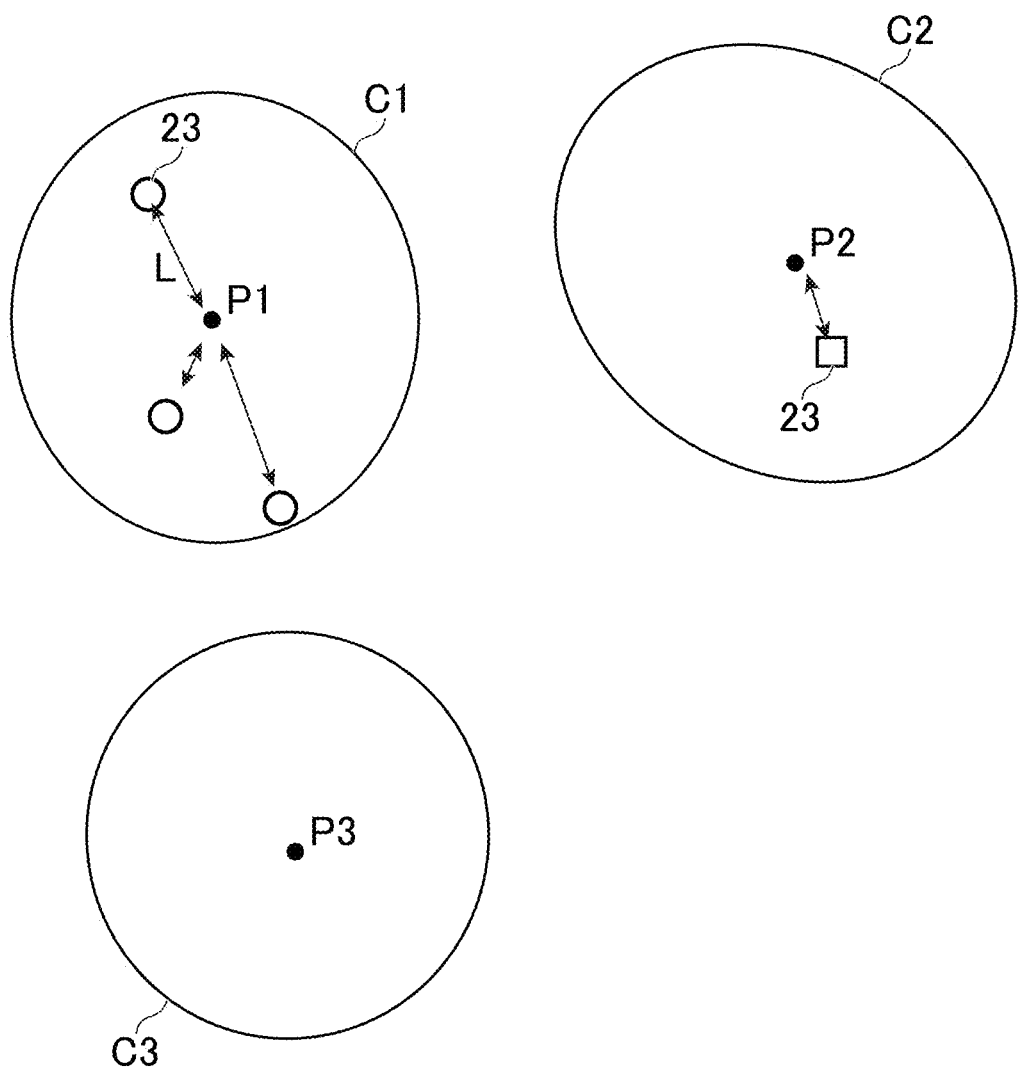
FIG. 9 is a diagram for illustrating a relationship between the feature vectors extracted from a certain image and the representative vector.

FIG. 9 is a diagram for illustrating a relationship between the feature vectors extracted from a certain image and the representative vector. The points 23 indicated by symbols such as a circle or a square indicate feature vectors extracted from a certain image. Further, points P1 to P3 indicate representative vectors of the respective clusters C1 to C3. In the example of FIG. 9, a distance L between a representative vector indicated by the point P1 and a feature vector associated with the representative vector is calculated as the score value.

After the score value is calculated, the feature value calculation module 54 calculates a plurality of feature values for each of the images (Step S106). The feature value calculation module 54 calculates a feature value for each representative vector of each of the images. The feature value is a value indicating a feature of the image that depends on the representative vector. The feature value calculation module 54 calculates a feature value for a certain representative vector of a certain image based on the score values acquired for one or a plurality of feature vectors corresponding to the representative vector among the feature vectors extracted from the image.

For example, the feature value calculation module 54 calculates a sum of the score values acquired for one or a plurality of feature vectors corresponding to a certain representative vector among the feature vectors extracted from a certain image, as the feature value for the image and representative vector. The method of calculating a feature value $v_i$ for the representative vector (hereinafter referred to as "i-th representative vector") of an i-th cluster for a certain image is expressed as the following expression. The subscript i indicates an integer equal to or larger than 1 and equal to or smaller than the sum of the number of clusters on each layer.

$$v_i = \sum_{d \in D_i} \|d - c_i\|  \qquad \text{[Formula 1]}$$

The symbol $C_i$ indicates an i-th visual word, namely, an i-th representative vector. The i-th cluster indicates any one of all the clusters on each layer, and the number i indicates a kind of sequence number assigned to all the clusters sequentially. The symbol $D_i$ indicates a set of feature vectors corresponding to the i-th representative vector among the feature vectors extracted from an image for calculation, and the symbol d indicates a feature vector contained in the set. In the expression given above, the sum of distances between the feature vectors and the representative vector is calculated to be a feature value.

Figure 10:
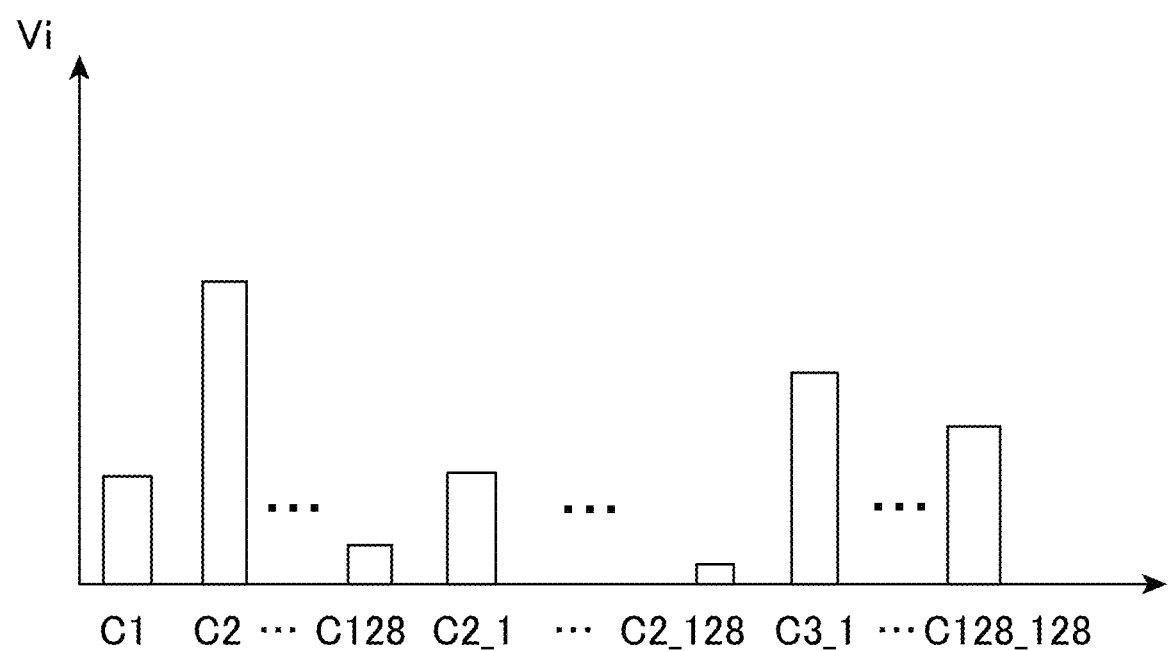
FIG. 10 is a graph for showing an example of a plurality of feature values calculated for a certain image.

The number of feature values calculated for a certain image is the same as the number of representative vectors, and the plurality of feature values result in a kind of weighted histogram. FIG. 10 is a graph for showing an example of the plurality of feature values $v_i$ calculated for a certain image. A set of feature values for a certain image is a kind of vector, and is a vector (hereinafter referred to as "image vector") indicating the features of the image. The data amount of this image vector is smaller than the data amount of feature vectors itself extracted from the image.

Further, the dimension of the image vector is fixed irrespective of the number of feature vectors extracted from the image.

The cluster has a hierarchical structure, and thus when a feature vector corresponds to a representative vector of a cluster (e.g., cluster C2_1) on a lower layer, the score value for the feature vector is calculated to be a non-zero value not only for the cluster on the lower layer, but for the cluster (e.g., cluster C2) on a higher layer. With this, it is possible to reduce the possibility of images being evaluated to be completely different from each other although those images are just slightly different from each other while ensuring the amount of data to be used for comparison by dividing the cluster.

After the plurality of feature values are calculated for each of the images, the index generation module 55 compresses the plurality of feature values calculated for each of the images, to thereby create a search index having a smaller data amount than that of the plurality of feature values (Step S107). Further, the index generation module 55 stores the created search index into the index storage 72 (Step S108). Compression of feature values is, for example, compression of dimensions of the image vector, and the index generation module 55 sets the image vector whose dimension is compressed as the search index of the image.

In the first embodiment, the dimension of the image vector is compressed by deep autoencoders (DAEs). The deep autoencoders are a calculation technique using a so-called neural network. In a neural network in which k-dimensional output data is output from k-dimensional input data via a m-dimensional (m<k) node, the index generation module 55 executes learning so that the input data and the output data become closest to each other as much as possible, and calculates a value of the m-dimensional node in a case where an image vector is input to the neural network after the learning, as a vector having the compressed image vector. With the autoencoders, it is possible to compress the dimension of data so that an important element of the image vector has a strong influence and an unimportant element thereof does not have a strong influence. The value of data to be input to the autoencoders is set to be equal to or larger than 0 and equal to or smaller than 1, and thus the index generation module 55 inputs, during learning and data compression, the feature value of the image vector, which has been converted in accordance with the following expression, as the data to be input to the autoencoders.

$$f(v_i) = \frac{2}{1 + e^{-v_i}} - 1 \qquad \text{[Formula 2]}$$

The dimension of the image vector may be compressed by a principal component analysis instead of the autoencoders. A more accurate search index can be generated by the autoencoders than the principal component analysis.

In the following, a description is given of processing of searching for, by the search processing module 60, an image by using the search index generated by the above-mentioned technique.

The query vector extraction module 61 is mainly implemented by the processor 11 executing a program to control the storage 12. The query vector extraction module 61 is configured to extract a plurality of query vectors indicating local features of a query image based on data on the query image input as a search condition.

The query correspondence determination module 62 is mainly implemented by the processor 11 executing a program to control the storage 12. The query correspondence determination module 62 is configured to select a representative vector (and cluster) corresponding to each of the plurality of extracted query vectors.

The query score value calculation module 63 is mainly implemented by the processor 11 executing a program to control the storage 12. The query score value calculation module 63 is configured to calculate a score value indicating the degree of similarity between each of the plurality of representative vectors and at least a part of the plurality of query vectors. For example, the query score value calculation module 63 calculates, for each of the representative vectors, a distance between the representative vector and each of the plurality of query vectors corresponding to the representative vector as the score value.

The query feature value calculation module 64 is mainly implemented by the processor 11 executing a program to control the storage 12. The query feature value calculation module 64 is configured to calculate, for the query image, a query feature value indicating a feature that depends on each representative vector for the representative vector.

The image search module 65 is mainly implemented by the processor 11 executing a program to control the storage 12. The image search module 65 is configured to retrieve an image similar to the query image based on the plurality of query feature values for the query image and the search index for the plurality of images stored in the index storage 72.

Figure 11:
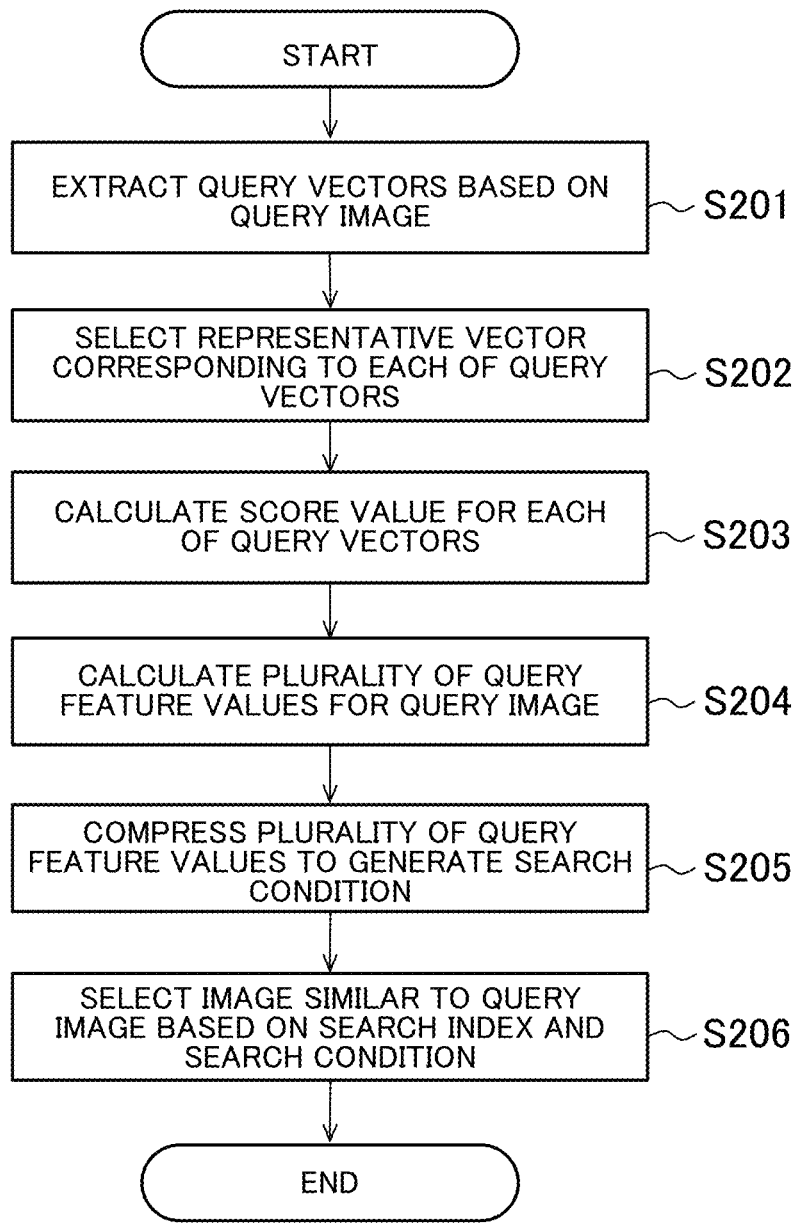
FIG. 11 is a flowchart for illustrating an example of processing by a search processing module.

Now, a description is given of processing to be executed by the search processing module 60 in more detail. FIG. 11 is a flowchart for illustrating an example of processing by the search processing module 60.

First, the query vector extraction module 61 extracts query vectors based on the query image input as a search condition (Step S201). The technique of extracting a query vector from the query image by the query vector extraction module 61 is the same as the technique of extracting a feature vector by the feature vector extraction module 51.

Next, the query correspondence determination module 62 selects a representative vector corresponding to each of the plurality of extracted query vectors (Step S202). More specifically, the query correspondence determination module 62 calculates, for each of the query vectors, a distance between the query vector and the representative vector, and selects a representative vector having the smallest distance as the representative vector corresponding to the query vector. The query correspondence determination module 62 may select a representative vector corresponding to the query vector based on the similarity degree instead of the distance.

After the representative vector is selected, the query score value calculation module 63 calculates, for each of the query vectors, a score value indicating the degree of similarity between the representative vector and a plurality of query vectors corresponding to the representative vector (Step S203). The technique of calculating a score value based on the representative vector and the query vectors corresponding to the representative vector is the same as the technique of calculating a score value based on the representative vector and the feature vectors corresponding to the representative vector by the score value calculation module 53.

Next, the query feature value calculation module 64 calculates, for each representative vector, a plurality of query feature values indicating features that depend on the representative vector, based on the score value for the query image (Step S204). The technique of calculating a plurality of query feature values based on the score value for the query image by the query feature value calculation module 64 is the same as the technique of calculating a plurality of feature values based on the score value for a certain image by the feature value calculation module 54.

Then, the image search module 65 compresses the plurality of calculated query feature values to generate a search condition for the search index (Step S205). The image search module 65 compresses the plurality of query feature values to generate the search condition by the same technique as the technique of compressing the plurality of feature values to generate the search index for a certain image by the index generation module 55.

After the search key is generated, the image search module 65 searches for an image similar to the query image based on the search index stored in the index storage 72 and the search condition generated based on the query image (Step S206). More specifically, the image search module 65 calculates the degree of similarity (e.g., distance) between the vector of the search condition and the vector of the search index, and selects an image based on the degree of similarity.

The technique in the embodiment of the present invention involves calculating the score value not as a vector but as a scalar value by the score value calculation module 53 and the query score value calculation module 63. In the invention of calculating a vector as the score value as described in Non-Patent Literature 1, there occurs a phenomenon in which a difference between a certain representative vector and a feature vector and a difference between the representative vector and another feature vector weaken features of those differences. In contrast, the technique in the embodiment of the present invention does not cause such a phenomenon. With this, it is possible to suppress deterioration in accuracy that may occur due to the configuration of calculating a vector as the score value when, for example, a certain image contains a large number of local features similar to each other and there are a large number of feature vectors corresponding to a certain representative vector. Further, in the embodiment of the present invention, the score value is a scalar value, and thus the amount of information required for one visual word is smaller than that of a vector. With this, in an image search, it is possible to handle a larger number of visual words while considering a difference between a feature vector and a visual word.

The invention claimed is:

1. An image search system, comprising:
   at least one processor; and
   at least one memory device that stores a plurality of instructions, which when executed by the at least one processor, causes the at least one processor to:
   classify, into a plurality of first clusters, a first plurality of feature vectors, each indicating a feature of an image, and the plurality of feature vectors being included in a feature vector space;
   generate a plurality of first representative vectors, each of which represents any one of the plurality of first clusters;
   classify, into a plurality of second clusters, a second plurality of feature vectors belonging to any one of the plurality of first clusters;
   generate a plurality of second representative vectors, each of which represents any one of the plurality of second clusters;
   calculate scalar values indicating a degree of similarity between each of the first plurality of feature vectors and one of the plurality of first representative vectors corresponding to each of the first/second first plurality of feature vectors and calculate scalar values between each of the second plurality of feature vectors and one of the plurality of second representative vectors corresponding to each of the second plurality of first/second feature vectors;
   calculate, for each of images, a feature value indicating a feature that depends on each of the plurality of first and second representative vectors based on the scalar values;
   create a search index associated with the calculated feature value; and
   search for an image similar to a query image based on the search index and a feature value acquired from the query image.

2. The image search system according to claim 1, wherein the processor calculates, for each of the images, a sum of scalar values which are calculated, for each of the plurality of first and second representative vectors, between one of the corresponding plurality of first and second representative vectors and the plurality of feature vectors.

3. The image search system according to claim 1, wherein the processor calculates, for each of the plurality of first and second representative vectors, a distance between one of the corresponding plurality of first and second representative vectors and each of the plurality of feature vectors corresponding to the plurality of first and second representative vectors as the scalar value.

4. The image search system according to claim 1, wherein the processor compresses a plurality of feature values for each of a plurality of images to create an index having a smaller data amount than a data amount of the plurality of feature values.

5. The image search system according to claim 4, wherein the processor compresses the plurality of feature values for each of the plurality of images by autoencoders.

6. The image search system according to claim 1,
   wherein the processor classifies, when a number of feature vectors classified to one of the plurality of first clusters is larger than a predetermined value, feature vectors belonging to the one of the first clusters into a plurality of second clusters, and
   wherein a plurality of feature vectors belonging to at least one of the plurality of first clusters are inhibited from being classified into any one of the plurality of second clusters.

7. An image search method, comprising:
   classifying, into a plurality of first clusters, a plurality of first feature vectors, each indicating a feature of an image and the plurality of feature vectors being included in a feature vector space with at least one processor operating with a memory device in a search server so as to generate a plurality of first representative vectors, each of which represents any one of the plurality of first clusters;
   classifying, into a plurality of second clusters, a second plurality of feature vectors belonging to any one of the plurality of first clusters with at least one processor operating with a memory device in a search server so as to generate a plurality of second representative vectors, each of which represents any one of the plurality of second clusters;
   calculating, with at least one processor operating with a memory device in a search server, scalar values indicating a degree of similarity between each of the first plurality of feature vectors and one of the plurality of first representative vectors corresponding to each of the first/second first plurality of feature vectors and calculate scalar values between each of the second plurality of feature vectors and one of the plurality of second representative vectors corresponding to each of the second plurality of feature vectors;

calculating, for each of images, a feature value indicating a feature that depends on each of the plurality of first and second representative vectors based on the scalar values with at least one processor operating with a memory device in a search server;

creating, with at least one processor operating with a memory device in a search server, a search index associated with the calculated feature value; and searching for an image similar to a query image based on the search index and a feature value acquired from the query image.

8. A non-transitory computer readable storage medium storing a plurality of instructions, wherein when executed by at least one processor, the plurality of instructions cause the at least one processor to:

classify, into a plurality of first clusters, a first plurality of feature vectors each indicating a feature of an image and the first plurality of feature vectors being included in a feature vector space;

generate a plurality of first representative vectors, each of which represents any one of the plurality of first clusters;

classify, into a plurality of second clusters, a second plurality of feature vectors belonging to any one of the plurality of first clusters;

generate a plurality of second representative vectors, each of which represents any one of the plurality of second clusters;

calculate scalar values indicating a degree of similarity between each of the first plurality of feature vectors and one of the plurality of first representative vectors corresponding to each of the first/second first plurality of feature vectors and calculate scalar values between each of the second plurality of feature vectors and one of the plurality of second representative vectors corresponding to each of the second plurality of feature vectors;

calculate, for each image, a feature value indicating a feature that depends on each of the plurality of first and second representative vectors based on the scalar values;

create a search index associated with the calculated feature value; and search for an image similar to a query image based on the search index and a feature value acquired from the query image.

* * * * *